(12) United States Patent
Shigehiro (10) Patent No.: US 6,891,642 B1
(45) Date of Patent: May 10, 2005

(54) APPARATUS FOR TREATING IMAGES (75) Inventor: Shoichi Shigehiro, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 837 days.

(21) Appl. No.: 09/621,136

(22) Filed: Jul. 20, 2000

(30) Foreign Application Priority Data

Jul. 23, 1999 (JP) .......................... 11-208632
Jul. 26, 1999 (JP) .......................... 11-210454

(51) Int. Cl.⁷ ................... H04N 1/387; H04N 1/393; H04N 1/40
(52) U.S. Cl. .................. 358/450; 358/451; 358/486; 358/540
(58) Field of Search ................. 358/450, 451, 358/448, 474, 486, 112, 1.16, 1.18, 540; 382/298, 299, 312, 284

(56) References Cited

U.S. PATENT DOCUMENTS 5,926,185 A * 7/1999 Vyncke et al. .......... 345/619
6,069,983 A * 5/2000 Otaki ..................... 382/296
6,147,768 A * 11/2000 Norris .................... 358/1.18
6,151,421 A * 11/2000 Yamada ................... 382/284
6,339,483 B1 * 1/2002 Hoshino et al. .......... 358/487
6,424,433 B1 * 7/2002 Miyauchi et al. ......... 358/471
6,473,196 B2 * 10/2002 Usami et al. ............ 358/1.18
6,501,556 B1 * 12/2002 Nishii ..................... 358/1.12

OTHER PUBLICATIONS

Cannon ImageRUNNER 400/300 series, 1998, Cannon, pp 1–5, 2–28, 2–29, 3–20, and 3–21.*

* cited by examiner

Primary Examiner—Edward Coles
Assistant Examiner—Chan S. Park
(74) Attorney, Agent, or Firm—Stevens, Davis, Miller & Mosher, LLP (57) ABSTRACT An apparatus for treating images by combining datas of the images to a data of a composite image including the images, has an image recording device for storing and respective datas of the images, and an image combining device for combining the datas of the images input from the image recording device to the data of the opposite image, and outputting the data of the composite image.

6 Claims, 12 Drawing Sheets

APPARATUS FOR TREATING IMAGES

BACKGROUND OF THE INVENTION AND RELATED ART STATEMENT

The present invention relates to an apparatus for treating images on respective pages, particularly to an apparatus for treating images by combining data of the images to a data of a composite image including the images.

In a prior art copy machine, for forming a composite image by printing a plurality of images on one copy sheet, the images on sheets arranged on a scanner of the copy machine are read respectively to print the images on the one copy sheet, or the sheets are supplied to the scanner one-sheet by one-sheet to read the images on the sheets respectively so that the images are printed on the one copy sheet.

OBJECT AND SUMMARY OF THE INVENTION

An object of the present invention is to provide an apparatus for treating images by combining datas of the images to a data of a composite image including the images, by which apparatus, contents of the composite image can be easily edited, and/or an arrangement of the images in the composite image formed by combining the images of various sizes or dimensions can be easily and appropriately determined.

An apparatus for treating images by combining datas of the images to a data of a composite image including the images, according to the present invention, comprises, an image recording device for storing respective datas of the images, and an image combining device for combining the datas of the images input from the image recording device to the data of the composite image including the images, and outputting the data of the composite image.

Since the image combining device combines the datas of the images input from the image recording device to the data of the composite image including the images, contents of the composite image (an arrangement of the images in the composite image) can be easily edited, and/or an arrangement of the images in the composite image formed by combining the images of various sizes or dimensions can be easily and appropriately determined.

It is preferable for editing easily the contents of the composite image (the arrangement of the images in the composite image) and/or determining easily and appropriately the arrangement of the images in the composite image formed by combining the images of various sizes or dimensions that the datas independent of each other are stored in the image recording device.

It is preferable for editing easily the contents of the composite image and/or determining easily and appropriately the arrangement of the images in the composite image formed by combining the images of various sizes or dimensions that an information for identifying a turn number of each of the data of the images stored in the image recording device in an order is attached to the each of the data of the images. The data of the images may be taken into and stored by the image recording device, one data by one data. The images may be read to be converted to the data of the images, one image by one image. The information for identifying the turn number of the each of the data of the images in the order, in which order the data of the images are taken into the image recording device, may be attached to the each of the data of the images. The information for identifying the turn number of the each of the data of the images in the order, in which order the images are read to be converted to the data of the images, may be attached to the each of the data of the images. The turn numbers of the data may be desirably set to form the order. The turn number attached to the data may be changeable. The information for identifying the turn number of the each of the data may be included by the each of the data (as, for example, a file name of the each of the data). The information for identifying the turn numbers of a plurality of the data may correspond to respective codes for identifying recording areas for storing respectively the plurality of the data (by, for example, setting in the image recording device or in a controller outside of the image recording device, relationships between addresses of the recording (memory) areas for storing respectively the plurality of the data in the image recording device and the turn numbers of the plurality of the data).

At least one of the data of the images stored in the image recording device may be selectively removable. At least one of the data of the images stored in the image recording device may be replaceable by a data of another image which is newly read. A content of at least one of the data of the images stored in the image recording device may be changeable.

The image combining device may combine the data of the images to the data of the composite image in such a manner that the images' are arranged on the composite image in accordance with the order. The image combining device may combine the data of the images to the data of the composite image in such a manner that the images are arranged on the composite image in accordance with the changed order including the changed turn number.

The apparatus may further comprise an image input device for reading each of the images to be converted to the data of the image, wherein the image input device includes picture elements, each of which picture elements reads a part of the each of the images to be converted to a part of the data of the image, and an area of the part of the each of the images to be read by each of the picture elements is changeable. The area of the part of the each of the images to be read by the each of the picture elements may be changed in accordance with a dimension of the each of the images to be read.

The apparatus may further comprise a printing device for printing the composite image on a work-piece on the basis of the data of the composite image, wherein the area of the part of the each of the images to be read by the each of the picture elements is changed in accordance with at least one of a dimension of the composite image to be printed and a dimension of the each of the images to be read so that the images are included by the composite image.

The image combining device may combine the data of the images to the data of the composite image including the images in such a manner that side edges of the images adjacent to each other are aligned along an imaginary straight line on the composite image. The image combining device may combine the data of the images to the data of the composite image including the images in such a manner that side edges of the images adjacent to each other face to each other and are parallel to each other on the composite image. The image combining device may combine the data of the images to the data of the composite image including the images in such a manner that side edges of the images adjacent to each other contact each other. The image combining device may combine the data of the images to the data of the composite image including the images in such a manner that two side edges of each of the four images adjacent to each other extend close to and parallel to respective two imaginary straight lines perpendicular to each other (that is, along the two imaginary straight lines perpendicular to each other) on the composite image.

The image combining device may combine the data of the images to the data of the composite image including the images while a data corresponding to a part of at least one of the images is deleted to prevent the part of at least one of the images from being included by the composite image.

The apparatus may further comprise a printing device for printing the composite image on a work-piece on the basis of the data of the composite image while feeding the work-piece in a printing direction, wherein the image combining device combines the data of the images to the data of the composite image in such a manner that the images are arranged along the printing direction in accordance with the order or the changed order including the changed turn number on the composite image. The image combining device may combine the data of the images to the data of the composite image such that the images are arranged along a direction perpendicular to the printing direction in accordance with the order or the changed order including the changed turn number on the composite image.

An image treating device according to the invention is constructed to read the images to input the data of the images, to record the input data of the images, to convert the recorded data of the images compositely to an image data for printing an continuous arrangement thereof, to print the compositely converted image data on a continuous printing medium, and to edit the recorded data of the images to print as a second time on the printing medium.

According to the invention, by printing the continues arrangement of the recorded data of the images read from manuscripts, editing the data of the image corresponding to unsatisfactory one of the printed images, and printing as a second time on the printing medium, the whole printed image can be easily adjusted.

The image treating device has an image input device for reading the images to input the data of the images, an image recording device for recording the input data of the images, an image combining device for converting compositely the recorded data of the images to the image data for printing the continuous arrangement thereof, an image printing device for printing the compositely converted image data on the continuous printing medium, and an image editing device for editing the data of the images recorded by the image recording device, so that the whole printed image can be easily adjusted by printing the continues arrangement of the recorded data of the images read from manuscripts, editing the data of the image corresponding to unsatisfactory one of the printed images, and printing as a second time on the printing medium.

The image editing device may replace desired one of the data of the images recorded in the image recording device by another image data, so that if a printed image read from a manuscript is unsatisfactory, a satisfactory image can be obtained by substituting therefor the another image data read again from the manuscript corresponding to the unsatisfactory printed image.

The image editing device may insert a data of another image to a desired position between the data of the images recorded by the image recording device, so that a manuscript failed to be read by any reason is read, and a data of the read image is inserted to a lacked position to obtain a desired composite image.

The image editing device may delete desired one of the data of the images recorded by the image recording device, so that an unnecessary image is deleted from the composite image to obtain the desired composite image without reading again all of the images.

The image treating device according to the invention has the image input device for reading the manuscripts to input the data of the images, the image recording device for recording the input data of the images, and the image combining device for converting compositely the recorded data of the images to the image data for printing the continuous arrangement thereof. According to the invention, since, the manuscripts can be arranged appropriately and the arrangement of the manuscripts can be understood easily.

Since the continuous arrangement of the manuscripts can be continuously output even if the manuscripts have non-standard sizes or respective sizes different from each other, by the image treating device having the image input device for reading the manuscripts to input the data of the images, the image recording device for recording the input data of the images, and the image combining device for converting compositely the recorded data of the images to the image data for printing the continuous arrangement thereof, the appropriate arrangement of the manuscripts can be output, and be printed out by a printer.

The image input device may input the data of the images expanded or contracted according to the size or dimensions of the manuscripts to be converted to the data of the image for printing the whole of each of the manuscripts by an arrangement with the expansion or reduction according to the size or dimensions of the manuscripts to be read.

By the image treating device having the image recording device for recording the data of the images supplied from a data source, and the image combining device for converting compositely the recorded data of the images to the image data for printing the continuous arrangement thereof, the continuous arrangement of the images can be output even if the images supplied from the data source have non-standard sizes or respective sizes different from each other.

The image treating device may further has a printing device for printing on a continuous printing medium the image data after conversion, so that the continuous arrangement of the images can be printed on the printing medium and the appropriate arrangement of the manuscripts is output.

DETAILED DESCRIPTION OF PREFERRED EMBODIMENTS

Figure 1:
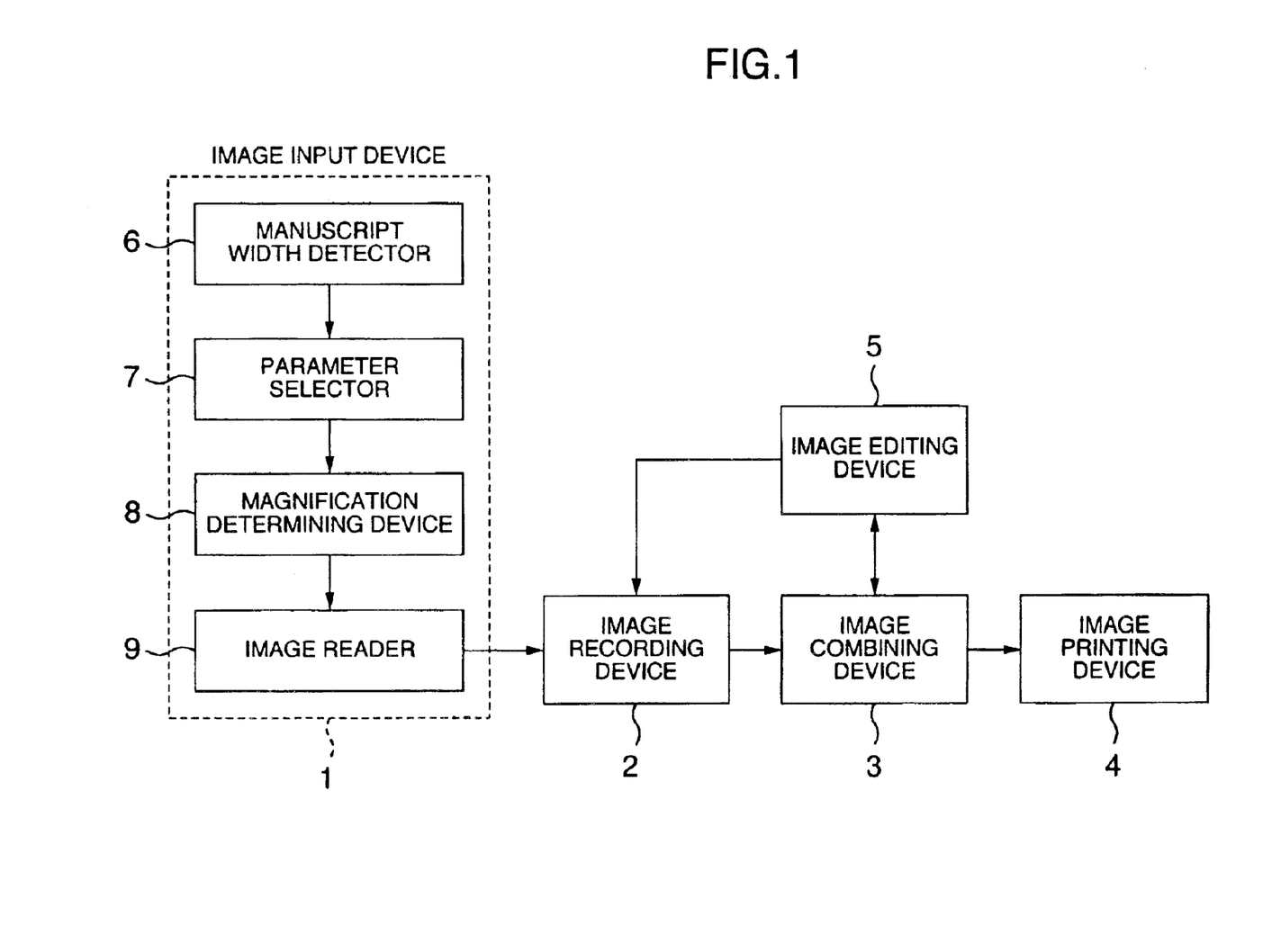
FIG. 1 is a block diagram showing an image treating apparatus in an embodiment form of the invention.

As shown in FIG. 1, an image treating apparatus of the invention has an image input device 1 for reading manuscripts to input data of images, an image recording device 2 for storing the data of the images input by the image input device 1, an image combining device 3 for combining the recorded data of the images to a data of a composite image including the images, an image printing device 4 for printing out the data of the images treated by the image combining device 3 onto a printing medium, and an image editing device 5 for controlling how to combine the data of the images recorded by the image recording device 2 at the image combining device 3.

The image input device 1 has a manuscript width detector 6 for detecting a width of the image or manuscript to be read, a parameter selector 7 for selecting a parameter to order an arrangement form of the output images on the printing medium or the composite image, a magnification determining device 8 for determining a magnification on reading the image (corresponding to a ratio between a number of image-reader picture-elements for converting the image to be read to an image data and a width of the image to be read, a ratio between the number of image-reader picture-elements and a width of a printed image corresponding to the images to be read may be fixed) on the basis of detection result of the manuscript width detector 6 and selection result of the parameter selector 7, and an image reader 9 for reading the manuscriptsor image to be read at the magnification determined by the magnification determining device 8. The magnification determining device 8 calculates the magnification on reading the manuscript or image at the image reader 9 on the basis of the width of the image or manuscript detected by the manuscript width detector 6, and a size of the printing medium and the arrangement form of the output images on the printing medium ordered by the parameter selector 7. For example, when the width of the manuscript is 297 mm, the size (width) of the printing medium is 210 mm and the arrangement form of the output images is two juxtaposed image-arrays in a transverse direction, the magnification on reading the manuscript or image is about 35%. By the image input device 1 as described above, the data of the image expanded or contracted at the magnification on reading the manuscript or image as determined by the magnification determining device 8 on the basis of the size or dimension of each of the manuscripts detected by the manuscript width detector 6 is input.

The image recording device 2 stores therein the data of the images input by the image input device 1 to be treated by the image combining device 3. In this case, the data of the images in an order in which the data of the images are input by the image input device 1 is recorded by the image recording device 2.

The image combining device 3 combines the recorded data of the images to the data of the composite image for printing the continuous arrangement of the images on the printing medium. In this case, the printing medium is a continuously rolled paper.

The image editing device 5 controls how the image combining device 3 combines the recorded data of the images to the data of the composite image to edit the data of the composite image while determining the arrangement of the images in the composite image by, replacing and/or deleting the data of the image recorded by the image recording device 2, selecting the data of the images to be fed from the image recording device 2 to the image combining device 3, determining an order in which the data of the images are fed from the image recording device 2 to the image combining device 3, inserting another image data between data of the images, and/or adding the another image data, on the basis of the detection result of the manuscript width detector 6 and/or the selection result of the parameter selector 7, that is, a condition of the image to be read and a desired composite image.

Figure 2:
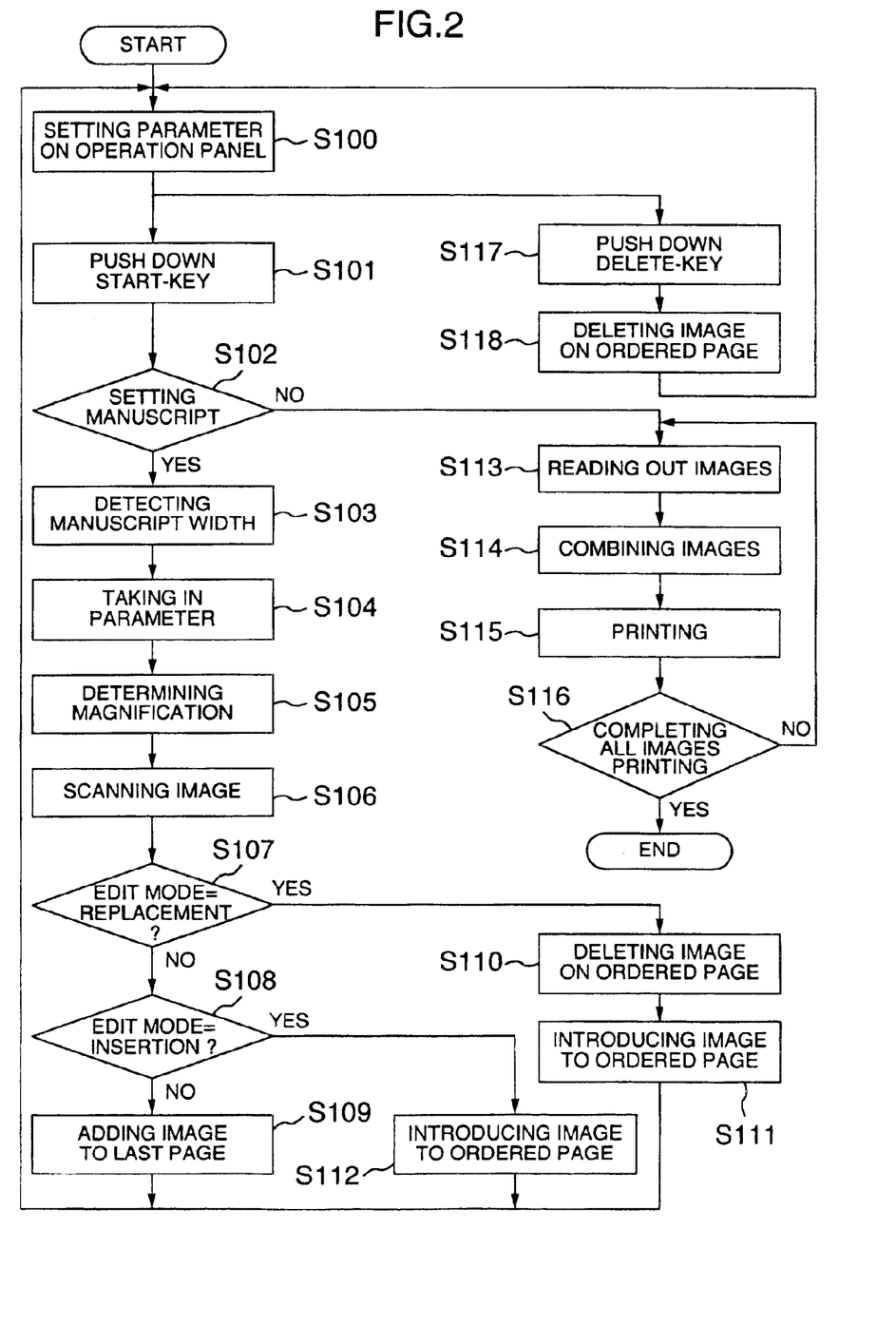
FIG. 2 is a flow chart of treatment in the image treating apparatus shown in FIG. 1.

In an operation of the image treating apparatus, as a start, after the manuscript is set on the image input device 1, parameters (a size of a rolled paper, a reading density, an output image arrangement, each edit mode of replacement, insertion and addition, a page to be edited or the like) are set on an operation panel of the image treating apparatus (S100), and a start-key of the image treating apparatus is pushed down (S101).

After the image input device 1 checks as to whether the manuscript has been set to confirm that the manuscript has been set (S102), the width of the manuscript is detected by the manuscript width detector 6 (S103). The parameter selector 7 detects the previously instructed parameters (S104), and the magnification on reading the manuscript is determined by the magnification determining device 9 in accordance with the width of each of the manuscripts detected by the manuscript width detector 6 (S105). Incidentally, in this embodiment, since all of the manuscripts have the same width and the printing is performed on the rolled paper of the same width of these manuscripts, the magnification on reading the manuscripts is constantly 100%.

The manuscript is read by the image reader 9 according to the magnification on reading the manuscripts determined by the magnification determining device 8 to input the data of the image (S106). When the edit mode is the addition mode, decisions at steps S107 and S108 are "No", and at step S109, the input data of the image is additionally stored as the last page in the data of the images recorded in the image recording device 2. Thereafter, the manuscript is set again on the image input device and the parameters are set (S100), and the start-key is pushed down to read subsequent one of the manuscripts so that the treating is repeated. When the edit mode is the addition mode, the manuscripts are read to be input in an order by the image input device so that the data of the images are respectively stored in the image recording device 2.

When the start-key is pushed down while the manuscript is not set, it is decided that all of the manuscript images have been completely input (S102). Subsequently, the data of the manuscript images recorded by the image recording device 2 are taken out successively (S113), and are combined compositely to the data of the image by the image combining device 3 to be printed on the printing medium. Since single image array in the traverse direction is arranged in an example shown in FIG. 3, the data of the images are printed on the rolled paper by the image printing device without specific composite treatment. Further, subsequent one of the data of the images is taken out (S113), and arranged onto a next step in a rolled direction of the rolled paper (vertical direction in FIG. 3) in the order so that all of the images are completely printed (S116).

Figure 3:
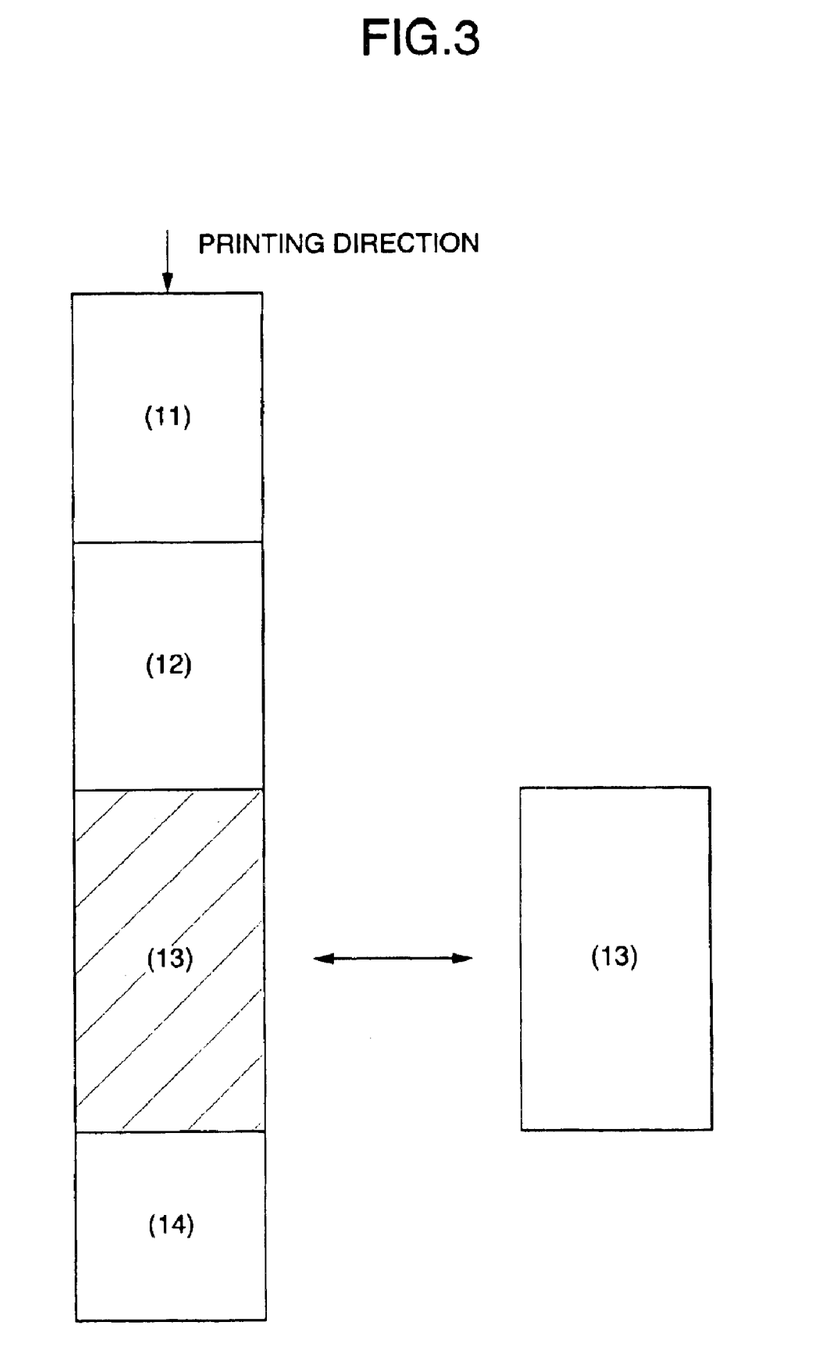
FIG. 3 is an explanation view showing that a desired one of data of images included by an image data of a composite image is replaced by another image data.

If one of the images (11)–(14) printed on the rolled paper is unsatisfactory in printing quality, the data of the image corresponding to the unsatisfactory one is edited by the image editing device 5. The manuscript corresponding to the unsatisfactory image (13) is set onto the image input device 1, and the parameter is set on the operation panel so that the edit mode is set to the replacement mode (S100). When the start-key is pushed down (S101), steps S102–S106 are performed, it is checked that the edit mode is the replacement mode (S107), and replacing steps (S110, S111) are performed.

The image editing device 5 deletes the image (13) of the page to be replaced from the data of the images recorded in the image recording device 2 (S110), and introduces an image (13) substituting for the deleted image to the page (S111). Thereafter, the data of the images are combined again by the image combining device 3 through the steps of S100–S102 and S113–S116 to be printed onto the rolled paper, so that the printed image with the replaced image (13) is formed.

As described above, the continuous arrangement of the data of the images recorded by reading the manuscripts is printed, the data of the image corresponding to the unsatisfactory-in-printing-quality one of the printed images is edited to be printed again on the printing medium, so that the printed composite image can be easily adjusted.

(Second Embodiment)

Figure 4:
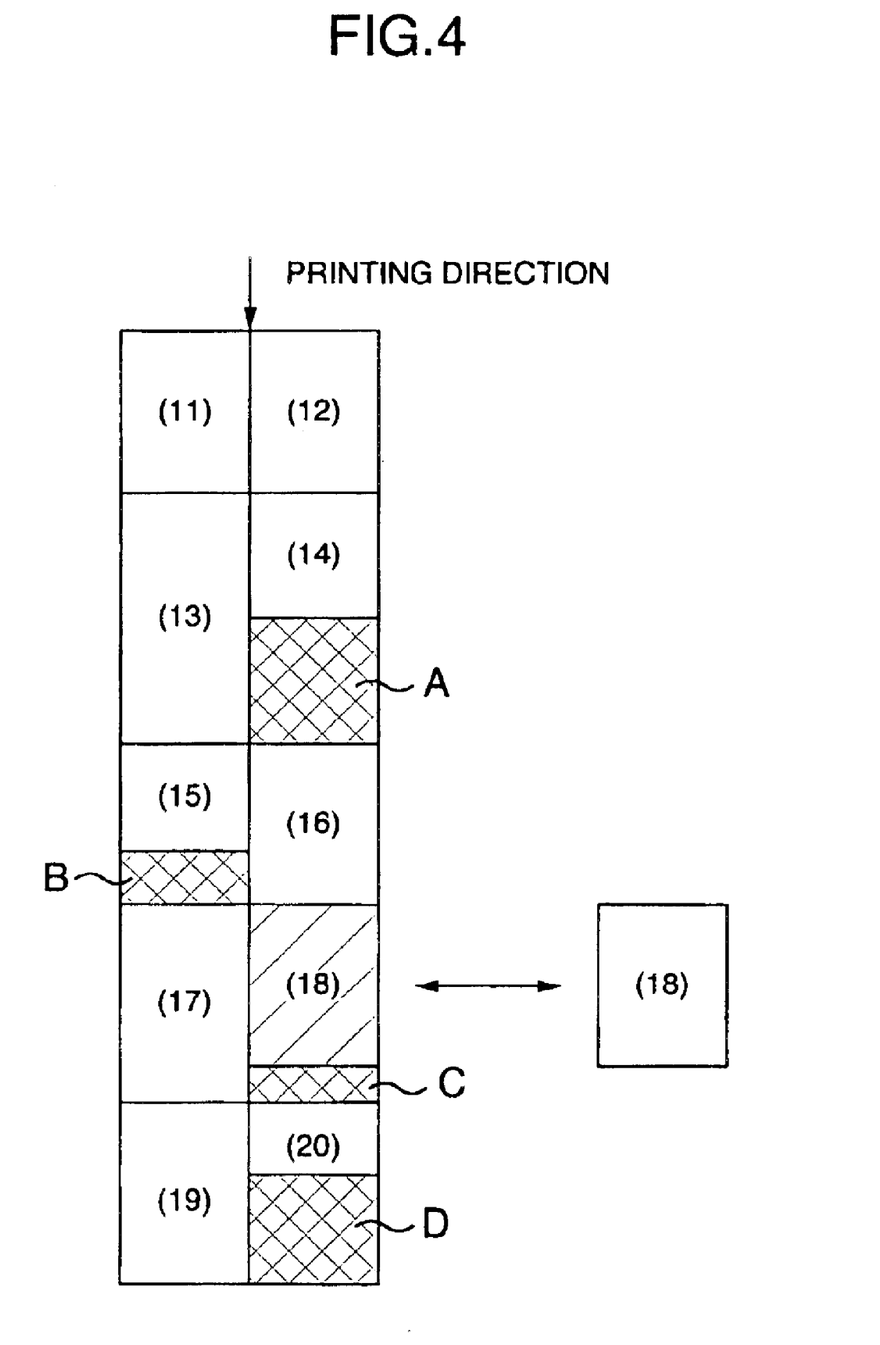
FIG. 4 is an explanation view showing that a desired one of data of images, included by an image data of a composite image with two juxtaposed image-arrays in a transverse direction, is replaced by another image data.

In the composite image shown in FIG. 4, a desired one image data in the data of the images included by the data of the composite image with two image arrays in the transverse direction is replaced by another image data. Ten manuscripts are read through the steps S100–S109 to be recorded in the image recording device 2, similarly to the first embodiment. Since all of the manuscripts have the same width and the two image arrays in the transverse direction are printed on the rolled paper of the same width with the manuscripts, the magnification on reading the manuscripts is constantly 50%. In this case, the widths of the two image arrays in the transverse direction are equal to each other.

After all of the manuscript images are completely input, the data for two images recorded in the image recording device 2 are output (S113), and are combined compositely to the data of the image to be printed on the printing medium by the image printing device 3 (S114). As shown in FIG. 4, the data for two images recorded in the image recording device 2 are combined to be arranged in the order from left to right, and the data of the composite image is printed on the rolled paper by the image printing device 4 (S115).

The data for further two images are output (S113), and arranged onto a next stage in the rolled direction of the rolled paper in the order. Gaps A, B, C and D are formed between the stages of the images to make positions of upper edges of the images juxtaposed in the transverse direction equal to each other if the two manuscripts to be juxtaposed in the transverse direction are different from each other in length, and all of the images are completely printed.

If one of the images (11)–(20) printed on the rolled paper is unsatisfactory in printing quality, the operation mode is set to the replacement mode, and the steps S100, S101–S107 and S110–S111 are performed so that the data of the image corresponding to the image (18) of the page to be replaced in the data of the images recorded in the image recording device is edited by the image editing device 5. Thereafter, the data of the images are printed on the rolled paper through the steps S100–S102 and S113–S116, so that the printed image in which the image (18) is replaced is obtained.

As described above, the data of the images recorded by reading the manuscripts are combined to the data of the composite image including the continuous arrangement in the plurality of the image arrays, and the manuscript corresponding to the image in the composite image unsatisfactory in printing quality is read again to obtain a data of an image to be substituted for the image unsatisfactory in printing quality, so that the printing quality is wholly adjusted easily.

(Third Embodiment)

Figure 5:
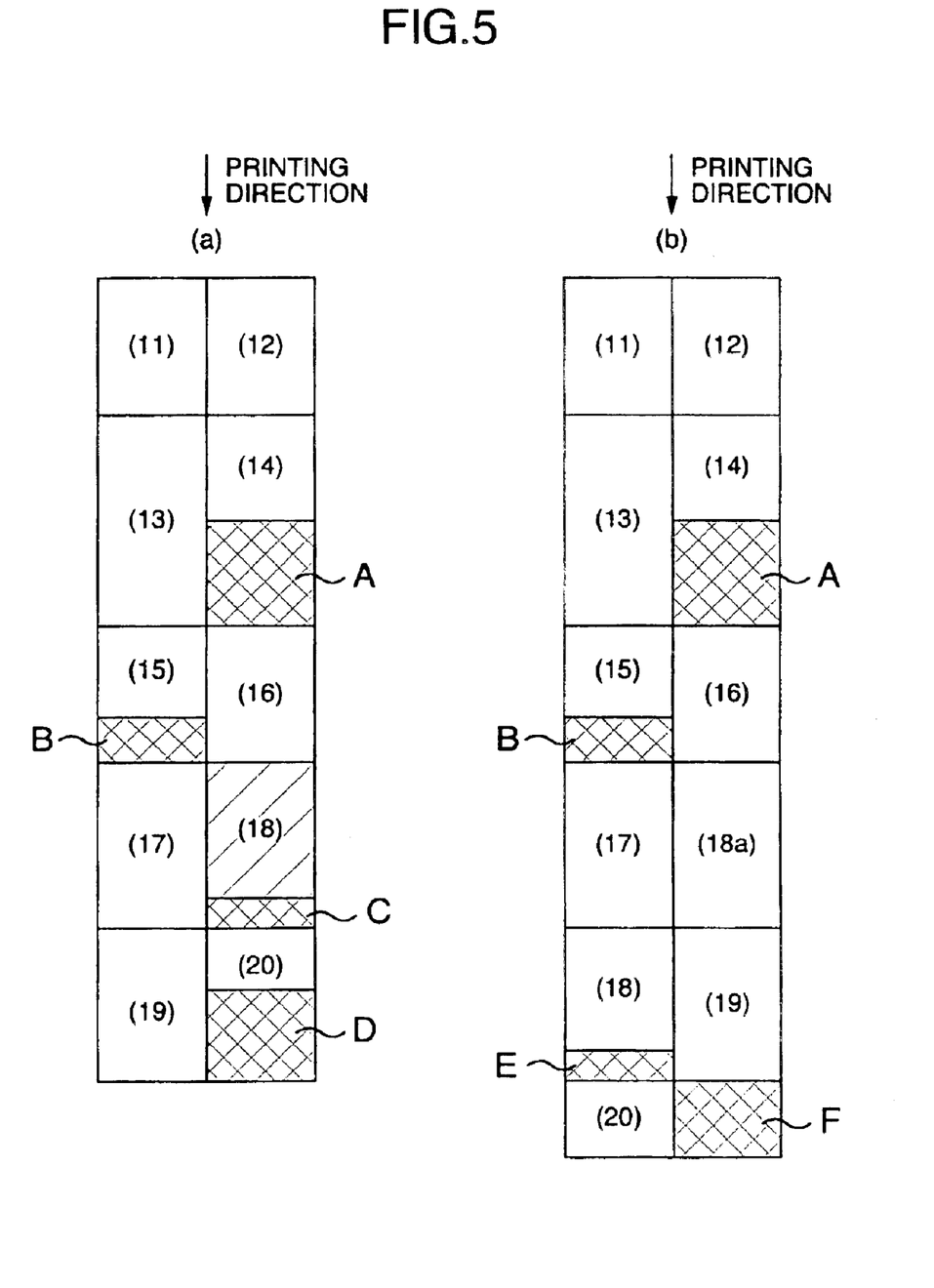
FIG. 5 is an explanation view showing that another data image is introduced to a desired position between data of images included by an image data of a composite image with two juxtaposed image-arrays in a transverse direction.

In the composite image shown in FIG. 5, another image is inserted to a desired position in the composite image including the two image arrays juxtaposed in the transverse direction. The another image is inserted between the image (11) and the image (20). In the composite image as a part (a) of FIG. 5, when the another image (18a) is inserted between the image (17) and the image (18), a manuscript of the another image (18a) is set on the image input device 1, and the parameter is set on the operation panel for the insertion mode as the edit mode. In response to the pushing down of the start key, as described above, the steps S102–S17 are performed, it is checked that the edit mode is the insertion mode (S108), and the insertion step (8112) is performed.

In the insertion step (S112), the another image (18a) is inserted to a desired position in the data of the images recorded by the image recording device 2. The images (18)–(20) to be behind the inserted another image (18a) are carried down one by one. Thereafter, the data of the images are combined again by the image combining device 3 through the steps S100–S102 and S113–S116 to be printed onto the rolled paper and output compositely as shown in a part (b) of FIG. 5. Clearances E and F between the images are automatically reformed.

As described above, only a manuscript failed to be read is read, and the read-in data of the image is inserted to the desired position to obtain a really desired composite image. That is, only the image to be inserted is read to easily adjust wholly the printing quality without reading again all of the images.

(Fourth Embodiment)

Figure 6:
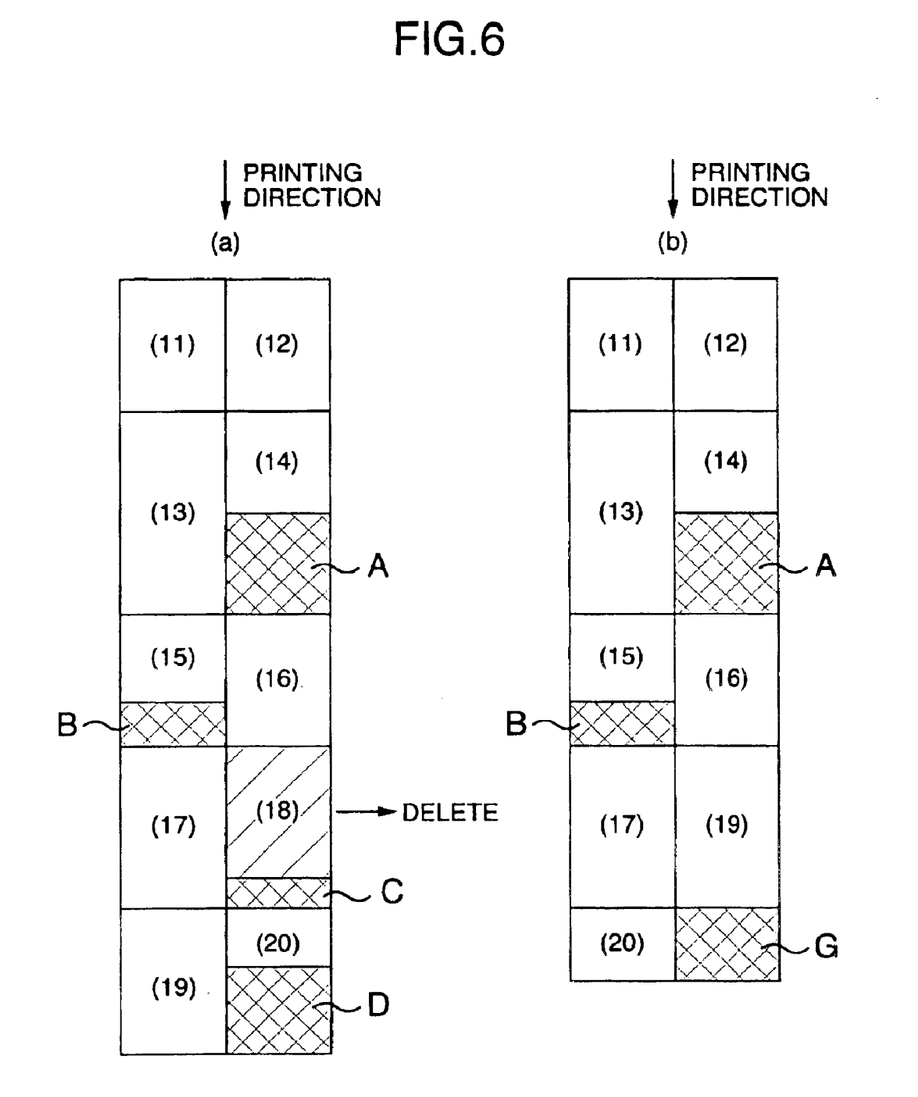
FIG. 6 is an explanation view showing that a desired one of data of images included by an image data of a composite image with two juxtaposed image-arrays in a transverse direction, is deleted.

In the composite image shown in FIG. 6, a desired data of an image included by the composite image with the two image arrays in the transverse direction is deleted. In the composite image as a part (a) of FIG. 6, when the image (18) between the image (17) and the image (19) is unnecessary, a page to be deleted is set on the operation panel (S100). In response to the pushing down of the start key, the data of the images (18) in the data of the images recorded by the image recording device 2 is deleted by the image editing device. The images (19) and (20) to be behind the deleted image (18) are automatically carried up one by one. Thereafter, the data of the images are combined again by the image combining device 3 through the steps S100–S102 and S113–S116 to be printed on the rolled paper and output compositely as shown in a part (b) of FIG. 6. The clearance G between the images is automatically reformed.

As described above, when the unnecessary image is included by the composite image, only the unnecessary image is deleted to obtain the really desired composite image. That is, only the unnecessary image is deleted to easily adjust wholly the printing quality without reading again all of the images.

Figure 7:
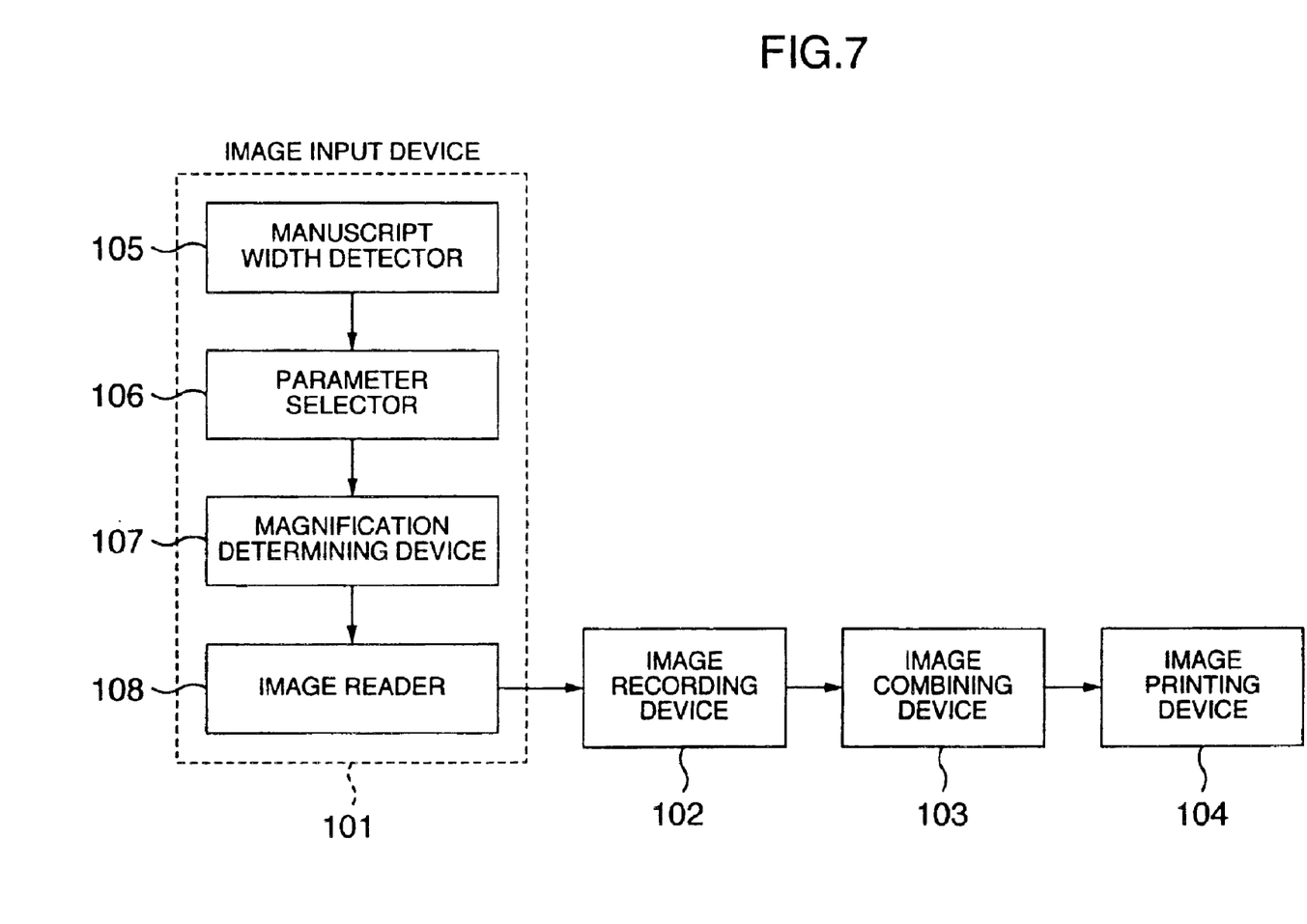
FIG. 7 is a block diagram showing an image treating apparatus in an embodiment form of the invention.

An image treating apparatus shown in FIG. 7 has an image input device 101 for reading the manuscripts to input the data of the images, an image recording device 102 for storing the data of the images input by the image input device 101, an image combining device 103 for combining the recorded data of the images to a data of a composite image, and an image printing device 104 for printing on the printing medium on the basis of the data of the images treated by the image combining device 103.

The image input device 101 has a manuscript width detector 105 for detecting a width of the image or manuscript to be read, a parameter selector 106 for selecting a parameter to order an arrangement form of the images in the output composite image, a magnification determining device 107 for determining the magnification on reading the image on the basis of the detection result of the manuscript width detector 105 and the selection result of the parameter selector 106, and an image reader 108 for reading the manuscript or image to be read at the magnification determined by the magnification determining device 107. The manuscript width detector 105 detects the width of each of the manuscripts or images of non-standard sizes or different sizes to be read by the image reader 108. The parameter selector 106 orders the size of the printing medium output by the image printing device 104 or composite image printed thereby, and how the images are output onto the printing medium or how the images are arranged on the composite image. The arrangement form of the images on the printing medium or the composite image ordered by the parameter selector 106 is described below.

The magnification determining device 107 calculates the magnification on reading the manuscript or image at the image reader 108 on the basis of the width of the image or manuscript detected by the manuscript width detector 105, and the size of the printing medium or composite image and the arrangement form of the images ordered by the parameter selector 6. For example, when the width of the manuscript is 297 mm, the size (width) of the printing medium is 210 mm and the arrangement form of the output images is two juxtaposed image-arrays in a transverse direction, the magnification on reading the manuscript or image is about 35%.

The image reader 108 reads the manuscript or image in accordance with the magnification on reading the manuscript as determined by the magnification determining device 107. By the image input device 101 as described above, the data of the image expanded or contracted at the magnification on reading the manuscript or image as determined by the magnification determining device 107 on the basis of the size or dimension of each of the manuscripts or images detected by the manuscript width detector 107 is input.

The image recording device 102 stores therein the data of the images input by the image input device 101 to be treated by the image combining device 103. In this case, the data of the images in an order in which the data of the images are input by the image input device 101 are recorded by the image recording device 102. The image combining device 103 converts and combines the data of the images recorded in the image recording device 102 to the data of the composite image including the image arrays arranged continuously by the image printing device 104. The image printing device 104 prints the composite image on the printing medium on the basis of the data of the composite image. In this case, the printing medium is the continuously rolled paper.

Figure 8:
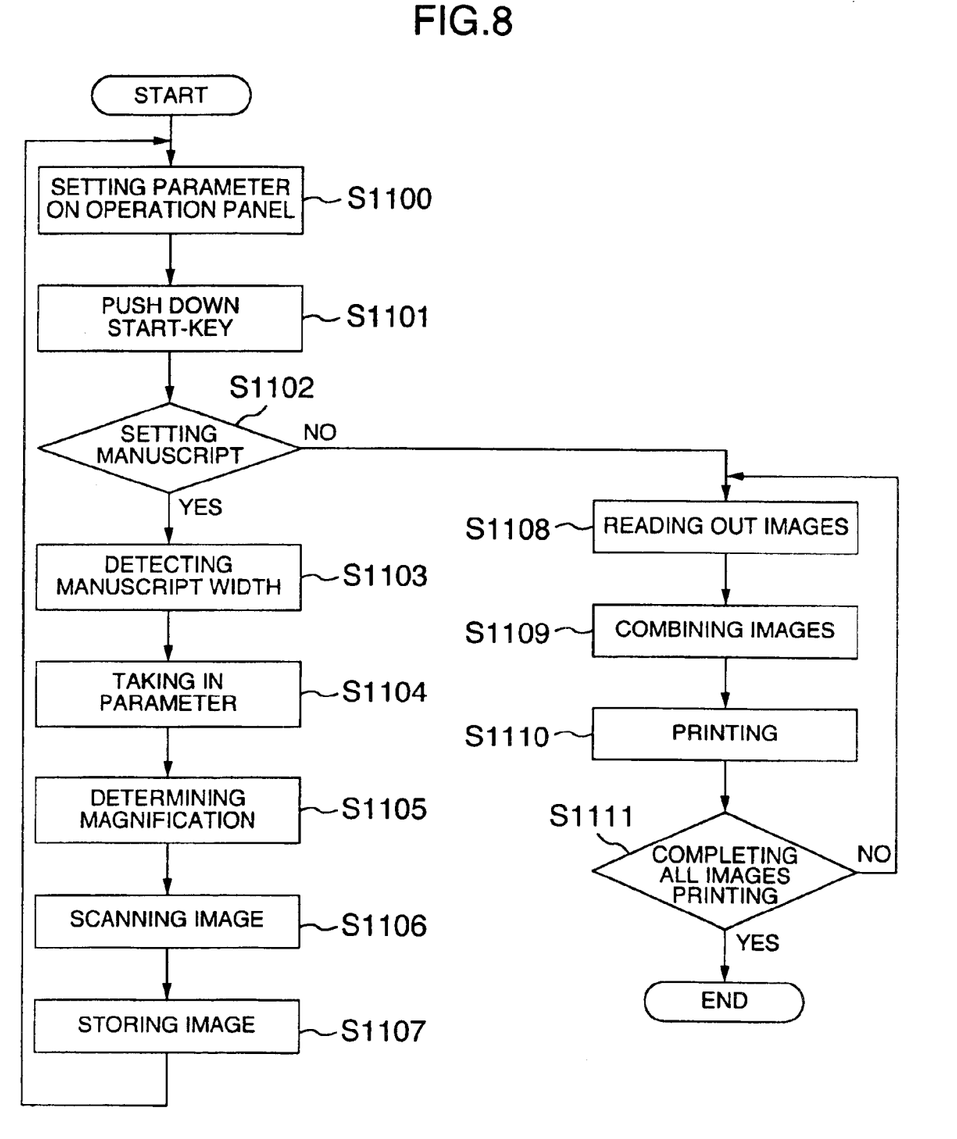
FIG. 8 is a flow chart of treatment in the image treating apparatus shown in FIG. 7.
Figure 9:
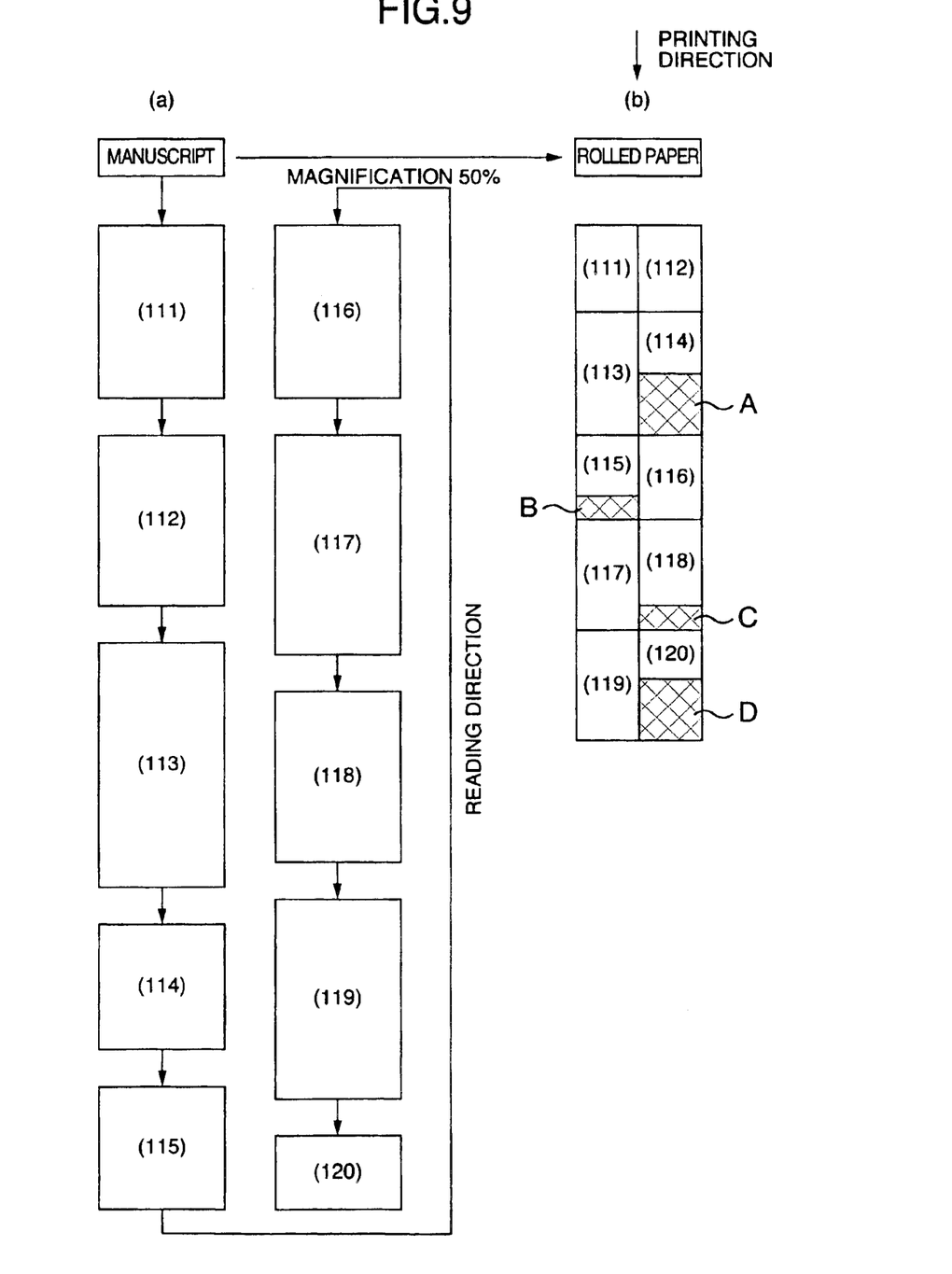
FIG. 9 is an explanation view showing a relationship between manuscripts to be read by an image input device and an image to be printed by an image printing device.

In the manuscripts (111)–(120) shown in a part (b) of FIG. 9, all of lateral widths (widths in a transverse direction of FIG. 9) are the same, but longitudinal lengths (lengths in a longitudinal direction of FIG. 9) are different from each other. Along a flow chart shown in FIG. 8, how these manuscripts (111)–(120) are arranged and printed out in two image arrays in the transverse direction onto the rolled paper as shown in a part (b) of FIG. 9 is explained. In this case, the rolled paper shown in the part (b) of FIG. 9 is rolled in the longitudinal direction in FIG. 9, and the width thereof in a perpendicular direction to the rolled direction (the transverse direction in FIG. 9) is the same with the manuscripts (111)–(120).

As a start, after the manuscript is set on the image input device 101, parameters (the size of the rolled paper, the output image arrangement or the like) are set on the operation panel of the image treating apparatus (S1100), and the start-key of the image treating apparatus is pushed down (S1101). After the image input device 101 checks as to whether the manuscript has been set to confirm that the manuscript has been set (S1102), the width of the manuscript is detected by the manuscript width detector 105 (S1103). The parameter selector 106 detects the previously instructed parameters (S1104), and the magnification on reading the manuscript is determined by the magnification determining device 107 in accordance with the width of each of the manuscripts detected by the manuscript width detector 105 (S1105). Incidentally, in this embodiment, since all of the manuscripts (111)–(120), have the same width and the printing is performed in the two image arrays in the transverse direction on the rolled paper of the same width with these manuscripts (111)–(120), the magnification on reading the manuscripts or images is constantly 50%. In this case, widths of the two image arrays in the transverse direction are equal to each other.

The manuscript is read by the image reader 108 according to the magnification on reading the manuscripts determined by the magnification determining device 107 to input the data of the image (S1106). The input data of the image is stored in the image recording device 102 (S1107). Thereafter, the manuscript is set again on the image input device 101 and the parameters are set (S1100), and the start-key is pushed down to read subsequent one of the manuscripts to input the data of the image (S1011). The manuscripts (111)–(120) are read to be input in an order by the image input device 101 so that the data of the images are respectively stored in the image recording device 102.

When the start-key is pushed down while the manuscript is not set, it is decided that all of the manuscript images have been completely input (S1102). Subsequently, the data of the manuscript images of two pages recorded by the image recording device 2 are taken out (S1108), and a formation of the data of the composite image is started by the image combining device 3 to be printed on the printing medium (S1109). As shown in the part (b) of FIG. 9, the data of the manuscripts images stored in the image recording device 102 are combined in such a manner that the images of the two pages are arranged in order in the transverse direction on the composite image, and the data of the composite image of the combined images is fed to the image printing device 4 so that the composite image is printed out onto the rolled paper (S110).

Further, the data of the images of subsequent two pages are taken out (S1108), and combined to subsequent part of the data of the composite image to be arranged in the order onto a subsequent stage in the rolled direction of the rolled paper. If the lengths of the manuscripts juxtaposed in the transverse direction are different from each other, clearances A, B, C and D are formed between the images of the juxtaposed stages to make positions of upper ends of the images juxtaposed in the transverse direction equal to each other, and the printing of all of the data of the images are finished (S1111). By making the upper positions of the images equal to each other when printing, the manuscripts are prevented from being scattered even when the sizes of the manuscripts are different from each other, and the whole arrangement of the manuscripts can be easily known.

Incidentally, the image printing device 104 may be separated from the image treating apparatus of the invention, so that the data of the composite image is output to a printer device or the like including the image printing device 4 to be printed. That is, the manuscript images are input from the image input device 101 such as a scanner or the like connected to a computer or the like, and the image printing device 104 such as the printer is connected to the computer to obtain operations and effects as described above.

Figure 10:
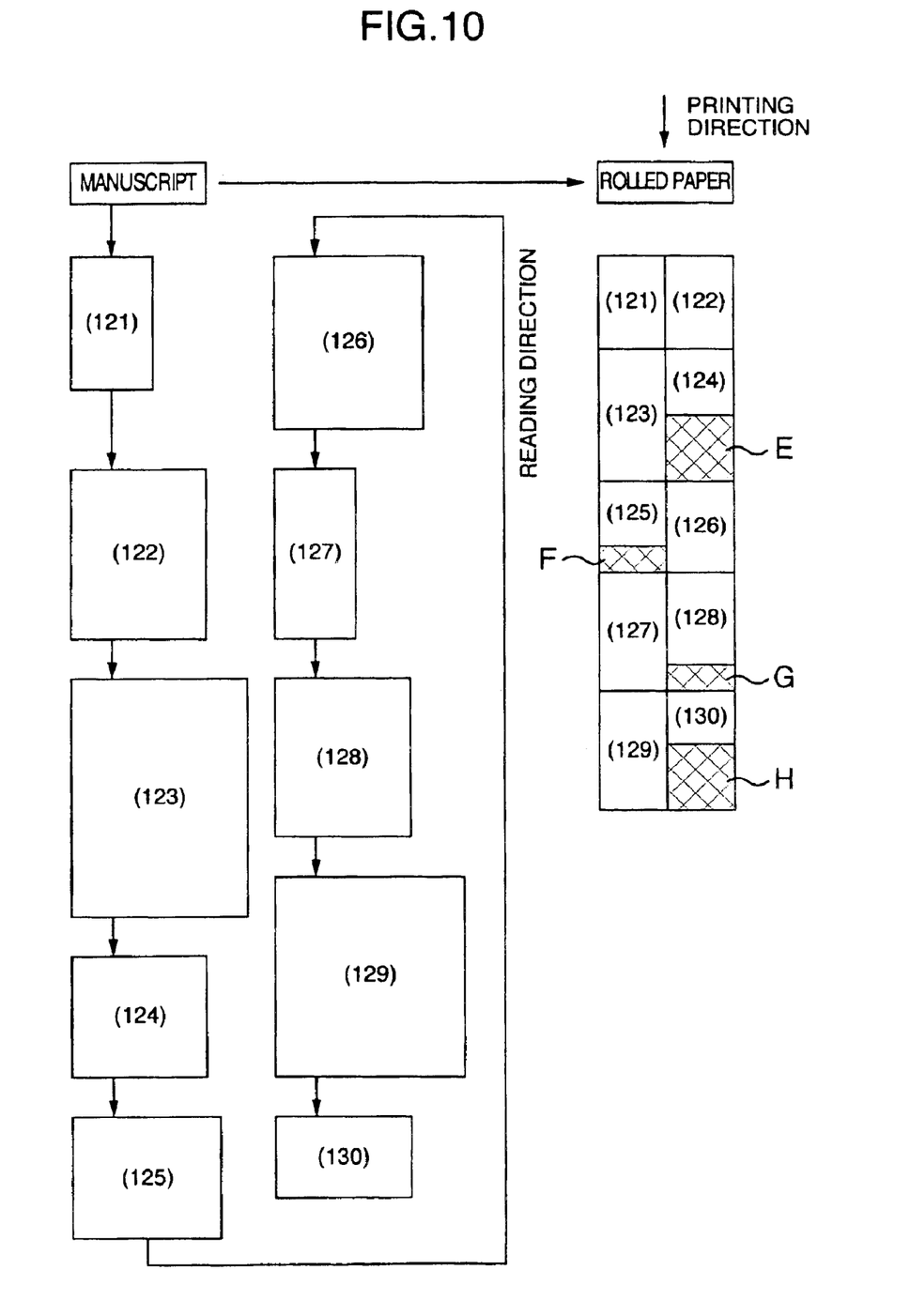
FIG. 10 is an explanation view showing another relationship between the manuscripts to be read by the image input device and the image to be printed by the image printing device.

The manuscripts (121)–(130) shown in FIG. 10 have non-standard-sizes different in width and length from each other. The width of each of the manuscripts (121)–(130) is detected by the manuscript width detector 105, and the magnification on reading the manuscripts are determined by the magnification determining device 107 in such a manner that each of the manuscripts (121)–(130) is included by a half of the width of the rolled paper. The magnification on reading is determined on the basis of the widths of the manuscripts (121)–(130), because the width of the rolled paper is constant, although the printing in the rolled direction of the rolled paper may be performed in accordance with the lengths of the manuscripts (121)–(130). Incidentally, in FIG. 10, as shown in FIG. 9, clearances E, F, G and H are formed between the images of the stages juxtaposed in the rolled direction of the rolled paper so that the positions of upper ends of the images juxtaposed in the transverse direction are equal to each other.

As described above, even when the manuscripts have non-standard sizes different from each other, the data of the image expanded or contracted in accordance with the width of each of the manuscripts (121)–(130) is input to arrange the images in such a manner that the whole of each of the manuscripts is printed, so that the whole arrangement of the images can be easily known and the whole of each of the manuscripts can be confirmed.

Figure 11:
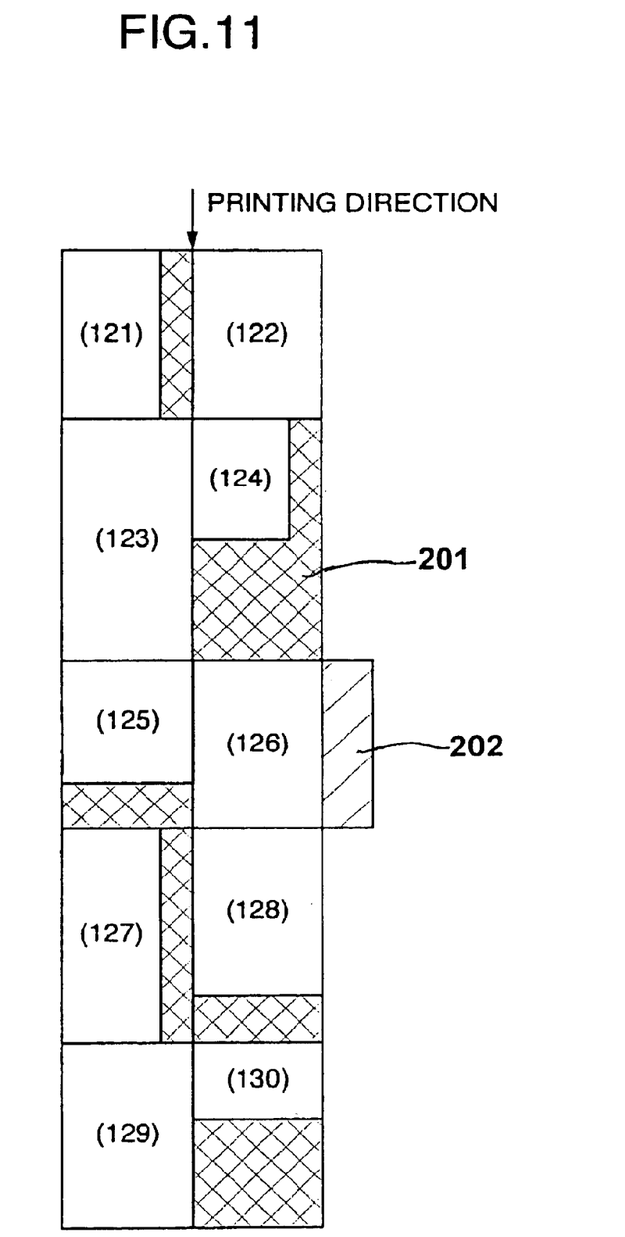
FIG. 11 is a view showing another form of the image for the manuscripts as shown in FIG. 10.

In the composite image shown in FIG. 11, the magnification on reading is set constantly at 50% by the magnification determining device 7 irrespective of the width of the each of the manuscripts (121)–(130). The images of the manuscripts (121)–(130) are arranged in such a manner that upper left ends of the manuscript images are set at a left end and a center of the rolled paper. In this case, vacant areas adjacent to right side of the manuscript images (shown by cross-hatching 201) and over-flow areas of the right side of the manuscript images (shown by hatching 202) are disregarded, and clearances are formed between the images of the stages juxtaposed in the rolled direction of the rolled paper. In this arrangement, the whole arrangement of the manuscripts can be known.

Figure 12:
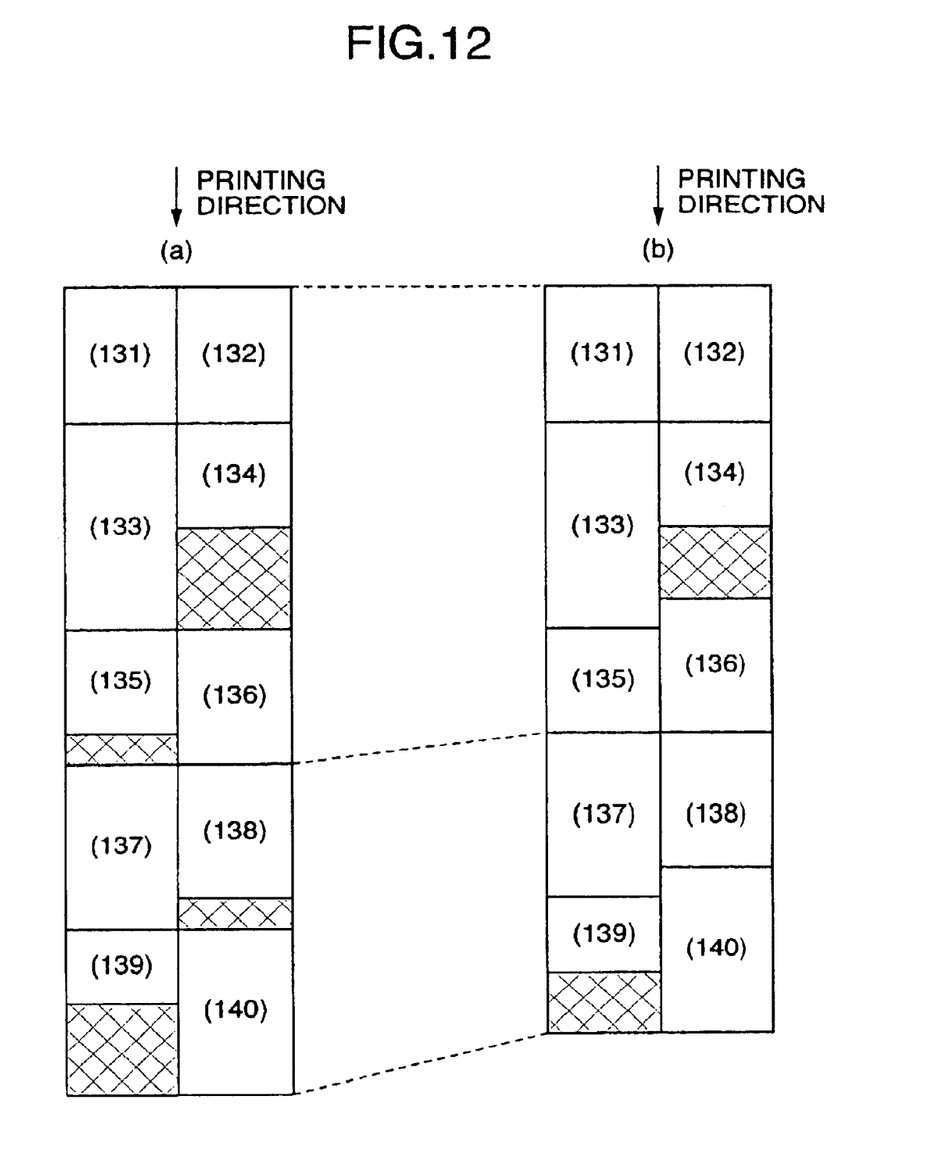
FIG. 12 is an explanation view showing another relationship between the manuscripts to be read by the image input device and the image to be printed by the image printing device.

In the composite image shown in FIG. 12, when the images of the manuscripts (131)–(140) are arranged in the rolled direction of the rolled paper, it is not carried out that the positions of the upper ends of the images juxtaposed in the transverse direction are equal to each other as shown in a part (a) of FIG. 12, but the positions of the upper ends of the images and positions of lower ends of the images in each pair of the stages are made equal to each other as shown in a part (b) of FIG. 12. In the part (b) of FIG. 12, the images (131)–(134) of first and second stages are arranged close to each other, and the positions of the lower ends of the images (135)–(136) in third stage are equal to each other.

By arranging the images in the each pair of the stages close to each other without making the positions of the lower or upper ends of the images (135)–(136) in each stage equal to each other, the clearances formed between the manuscripts of the respective stages are reduced, and an amount of the rolled to be used can be decreased.

Incidentally, although only the widths are detected by the manuscript width detector 105 to perform the adjustment on the basis of the widths in the embodiments of the invention, the adjustment may be performed with detecting not only the widths but also the sizes or dimensions of the manuscripts including the lengths of the manuscripts and so forth.

In another embodiment, the treatment may be performed on the basis of the data of the images formed by using the computer without the image input device 101 of the above described embodiments. In this case, the data of the images formed by using the computer are stored in a memory on the computer, the data of the images fed from the data source such as the memory are recorded in the image recording device 102, and the treatment thereafter may be performed as the above described processes.

What is claimed is:

1. An apparatus for treating images by combining data of the images into data of a composite image, the apparatus comprising:
    an image input device for reading each of the images to be converted to the data of the image;
    an image recording device for storing the respective data of the images;
    an image combining device for combining the data of the images, input from the image recording device, into the data of the composite image and outputting the data of the composite image; and
    a printing device for printing the composite image on a work-piece, on the basis of the data of the composite image, wherein:
    the image input device includes picture elements, each of which picture elements reads a part of each image to be converted,
    an area of the part of each image to be read by each picture element is changeable in accordance with at least one of a dimension of the composite image to be printed and a dimension of each image to be read, so that the images are included in the composite image.

2. An apparatus according to claim 1, wherein each printed image of the composite image has a predetermined width in a direction perpendicular to a printing direction of the printing device.

3. An apparatus according to claim 1, wherein the printed images of the composite image have a predetermined common width in a direction perpendicular to a printing direction of the printing device.

4. An apparatus according to claim 1, wherein:
    each printed image of the composite image has an upstream end arranged at an upstream side of the image in a printing direction of the printing device, and
    the image combining device combines the data of the images in such a manner that the upstream ends of the printed images adjacent to each other in a direction perpendicular to the printing direction are aligned to form a straight line extending in the perpendicular direction.

5. An apparatus according to claim 1, wherein:

each printed image of the composite image has a predetermined width in a direction perpendicular to a printing direction of the printing device, each of the printed images has an upstream end arranged at an upstream side of the image in the printing direction of the printing device, and the image combining device combines the data of the images in such a manner that the upstream ends of the printed images adjacent to each other in a direction perpendicular to the printing direction are aligned to form a straight line extending in the perpendicular direction.

6. An apparatus according to claim 1, wherein:

the printed images of the composite image have a predetermined common width in a direction perpendicular to a printing direction of the printing device, each of the printed images has an upstream end arranged at an upstream side of the image in the printing direction of the printing device, and the image combining device combines the data of the images in such a manner that the upstream ends of the printed images adjacent to each other in a direction perpendicular to the printing direction are aligned to form a straight line extending in the perpendicular direction.

* * * * *